United States Patent [19]

Lutz

[11] Patent Number: 4,761,449

[45] Date of Patent: Aug. 2, 1988

[54] FLAME RETARDANT COMPOSITIONS

[75] Inventor: Robert G. Lutz, Santa Rosa, Calif.

[73] Assignee: Shell Oil Company, Houston, Tex.

[21] Appl. No.: 111,466

[22] Filed: Oct. 22, 1987

[51] Int. Cl.$^4$ .............................................. C08G 3/26
[52] U.S. Cl. ..................................... 524/424; 524/427
[58] Field of Search ................................ 524/424, 427

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 3,948,850 | 4/1976 | Hudgin | 524/417 |
| 3,968,082 | 7/1976 | Hudgin | 524/302 |
| 4,139,522 | 2/1979 | Lantos | 524/414 |

FOREIGN PATENT DOCUMENTS

| | | |
|---|---|---|
| 121965 | 10/1984 | European Pat. Off. . |
| 181014 | 5/1986 | European Pat. Off. . |
| 113845 | of 1974 | Japan . |
| 123638 | of 1980 | Japan . |
| 5262 | of 1981 | Japan . |
| 1081304 | 3/1965 | United Kingdom . |

OTHER PUBLICATIONS

Hilado, Carlos: Flammability of Solid Plastics—vol. 7 of the Fire and Flammability Series, pp. 263-275 (1974).

*Primary Examiner*—Veronica P. Hoke

[57] ABSTRACT

Flame retardant compositions comprise linear alternating polymers of carbon monoxide and at least one ethylenically unsaturated hydrocarbon and a minor quantity, relative to the polymer, of an alkaline earth metal carbonate.

7 Claims, No Drawings

FLAME RETARDANT COMPOSITIONS

FIELD OF THE INVENTION

Compositions comprising carbon monoxide/ethylenically unsaturated hydrocarbon polymers and alkaline earth metal carbonates demonstrate flame retardancy.

BACKGROUND OF THE INVENTION

The general class of polymers of carbon monoxide and one or more ethylenically unsaturated hydrocarbons has been known for some years. Brubaker, U.S. Pat. No. 2,495,286, produced such polymers of relatively low carbon monoxide content in the presence of free radical catalysts such as benzoyl peroxide. British Pat. No. 1,081,304 produced such polymers of higher carbon monoxide content in the presence of alkylphosphine complexes of palladium as catalyst. Nozaki extended the process to arylphosphine complexes of palladium. See, for example, U.S. Pat. No. 3,694,412.

More recently, the class of linear alternating polymers of carbon monoxide and unsaturated hydrocarbons, now known as polyketones, has become of greater interest, in part because of improved methods of production. Such methods are shown by European Patent Applications Nos. 0,181,014 and 0,121,965. The disclosed processes employ, inter alia, a compound of a Group VIII metal such as palladium, an anion of a non-hydrohalogenic acid having a pKa below 2 and a bidentate ligand of phosphorus. The resulting polymers are generally high molecular weight thermoplastic polymers having utility in the production of articles such as containers for food and drink and parts for the automotive industry or structural members for use in the construction industry.

With regard to any plastic material employed in a public application, some concern must be shown for the consequences of the material catching fire and burning. Many plastics, e.g., polyvinylchloride, produce highly toxic gases upon combustion. The use of polyketones has advantages in this regard since only atoms of carbon, hydrogen and oxygen are present in the polymer molecule. Nevertheless, it would be of advantage to provide for flame retardant compositions of polyketone polymers.

SUMMARY OF THE INVENTION

This invention relates to flame-retardant compositions of linear alternating polymers of carbon monoxide and at least one ethylenically unsaturated hydrocarbon. More particularly, the invention relates to compositions of such polymers incorporating a flame-retardant quantity of an alkaline earth metal carbonate.

DESCRIPTION OF THE INVENTION

The polymers from which the compositions of the invention are produced are linear alternating polymers of carbon monoxide and at least one ethylenically unsaturated hydrocarbon. Suitable ethylenically unsaturated hydrocarbons have up to 20 carbon atoms inclusive, preferably up to 10 carbon atoms inclusive and are wholly aliphatic such as ethylene and other α-olefins including propylene, butene-1, octene-1 and dodecene-1 or are arylaliphatic containing an aryl substituent on an otherwise aliphatic molecule, particularly an aryl substituent on a carbon atom of the ethylenic unsaturation. Illustrative of this latter class of olefins are styrene, p-methylstyrene, m-methylstyrene and p-ethylstyrene. Preferred polyketone polymers are copolymers of carbon monoxide and ethylene or terpolymers of carbon monoxide, ethylene and a second aliphatic α-olefin of 3 or more carbon atoms, particularly propylene.

Of particular interest are those polymers of molecular weight from about 1,000 to about 200,000, particularly those of molecular weight from about 10,000 to about 50,000, and containing substantially equimolar quantities of carbon monoxide and ethylenically unsaturated hydrocarbon.

Such polymers are typically produced by contacting the carbon monoxide and the ethylenically unsaturated hydrocarbon(s) under polymerization conditions in the presence of a catalytic amount of a catalyst formed from a compound of the Group VIII metals palladium, cobalt or nickel, the anion of a non-hydrohalogenic acid of a pKa less than about 6, preferably less than about 2, and a bidentate ligand of phosphorus, arsenic or antimony. Although the scope of the polymerization is extensive, for purposes of illustration a preferred Group VIII metal compound is palladium acetate, the anion is the anion of an acid selected from trifluoroacetic acid and para-toluenesulfonic acid and the bidentate ligand is selected from 1,3-bis(diphenylphosphino)propane and 1,3-bis[di(2-methoxyphenyl)phosphino]propane.

Polymerization is carried out at polymerization conditions, typically at elevated temperature and pressure, in the gaseous phase or in the liquid phase in the presence of an inert diluent, e.g., a lower alkanol such as methanol or ethanol. The reactants are contacted by conventional methods such as stirring or shaking and subsequent to reaction the polymer product is recovered as by decantation or filtration. The polymer product may contain metallic residues from the catalyst which are removed by contact with a solvent which is selective for the residues. Production of these polymers is illustrated, for example, by published European Patent Applications Nos. 0,181,014 and 0,121,965.

The physical properties of the polymer will be determined in part by the molecular weight and by whether the polymer is a copolymer or a terpolymer. Typical melting points are from about 175° C. to about 300° C., more typically from about 210° C. to about 280° C. The structure of the preferred polymers is that of a linear alternating polymer of carbon monoxide, ethylene and any second ethylenically unsaturated hydrocarbon. When terpolymers of carbon monoxide, ethylene and a second ethylenically unsaturated hydrocarbon, e.g., a hydrocarbon of at least 3 carbon atoms, are produced there will be at least two units incorporating moieties of ethylene per unit incorporating a moiety of the second unsaturated hydrocarbon, preferably from about 10 units to about 100 units incorporating moieties of ethylene per unit incorporating a moiety of the second unsaturated hydrocarbon. The polymer chain of the preferred class of polymers is illustrated by the formula

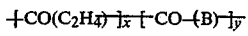

$$\mathrm{+CO(C_2H_4)}\mathrm{\!\!\!+_x\!\!\!+CO\!\!-\!\!(B)\!\!+_y}$$

wherein B is the moiety obtained by polymerization of the second ethylenically unsaturated hydrocarbon through the ethylenic unsaturation. The —CO(C₂H₄— units and the —CO(B— units occur randomly throughout the polymer molecule and the ratio of y:x is no more than about 0.5. In the modification of the invention which employs copolymers of carbon monoxide and ethylene without the presence of a second ethylenically unsaturated hydrocarbon, the term y=0 and the ratio of y:x is also 0. When terpolymers are employed, i.e., y is greater than 0, ratios of y:x from about 0.01 to about 0.1 are preferred. The end groups or "caps" of the polymer chain will depend on the particular materials present during its production and whether and how the polymer has been purified. The precise nature of the end groups is of little significance with regard to the overall properties of the polymer so that the polymer is fairly represented by the polymer chain as depicted above.

The flame retardant compositions of the invention contain a flame retarding quantity of an alkaline earth metal carbonate which will be a minor quantity, relative to the polymer. By alkaline earth metal carbonate is meant a carbonate salt of a metal of Group IIA of the Periodic Table of Elements. While carbonate salts of beryllium, magnesium, calcium, strontium and barium are suitable, the preferred flame retarding carbonate salts are carbonates of magnesium and calcium, particularly calcium.

The alkaline earth metal carbonate is typically provided in the form of a fine powder, for example, above about 0.04 $\mu$m but below about 100 $\mu$m. The alkaline earth metal carbonate is preferably employed as such, but in alternate modifications alkaline earth metal compounds may be utilized which serve to generate alkaline earth metal carbonates during processing or upon exposure of the resulting composition to heat at temperatures lower than those at which flame would result. An example of a material useful as an alkaline earth metal carbonate precursor is the corresponding alkaline earth metal bicarbonate.

The alkaline earth metal carbonates are employed as the sole flame retarding maerial and alternatively are utilized with other materials such as ammonium thiosulfate, asbestos, alkali metal carbonates or bicarbonates, e.g., potassium bicarbonate or stannous or stanic oxide. The preferred compositions of the invention, however, are those wherein alkaline earth metal carbonate is employed as substantially the sole material used to impart flame retardancy to the polyketone composition. The alkaline earth metal carbonate is employed in an amount sufficient to render the resulting composition flame retardant. Quantities from about 2% by weight to about 30% by weight, based on total composition are useful with quantities from about 5% by weight to about 15% by weight being preferred.

The flame retardant compositions are produced by mixing the alkaline earth metal carbonate throughout the polyketone polymer. The method of forming the composition is not critical so long as the method results in a uniform mixture of alkaline earth carbonate throughout at least the outer layer of the polyketone polymer. In a preparation of a composition useful in the form in which it is produced, only the outermost portion of the composition need be provided with alkaline earth metal carbonate. However, in most applications, a flame retardant composition is produced which is then processed further and in such applications the production of a substantially uniform mixture of polyketone polymer and alkaline earth metal carbonate is preferred. In one modification, the compositions are produced by dry blending the components in particulate form and converting to a substantially uniform composition by application of heat and pressure. Alternatively, the compositions are produced by heating the polyketone polymer until molten and the alkaline earth metal carbonate or precursor thereof is mixed throughout the polymer by use of a high-shear mixer or extruder.

The polymer composition, in addition to polymer and alkaline earth metal carbonate, may incorporate other conventional additives which do not detract from the flame retardant character of the composition. Examples of such additives are plasticizers, mold release agents and antioxidants which are added by blending or other conventional methods together with or separately from the alkaline earth metal carbonate.

The flame retardant compositions are processed by injection molding, pressure forming or other conventional methods. They are characterized by properties of flexibility and strength in addition to flame retardancy and are useful in a variety of applications, particularly where exposure to elevated temperature is likely to be encountered. The compositions have particular utility in the production of containers for the food and drink industry, particularly those likely to be subjected to elevated temperatures such as the trays used in conjunction with frozen dinners. The compositions are also useful in the production of parts for the automotive industry, particularly those parts located within the engine compartment where high temperatures are encountered or those parts which encounter heat as during the baking of painted surfaces.

The compositions of the invention are further illustrated by the following Illustrative Embodiments which should not be construed as limiting the invention.

ILLUSTRATIVE EMBODIMENT I

A first terpolymer of carbon monoxide, ethylene and propylene was prepared in the presence of a catalyst formed from palladium acetate, trifluoroacetic acid and 1,3-bis(diphenylphosphino)propane. The polymer had a melting point of 219° C. and a limiting viscosity number (LVN) of 1.60 measured at 60° C. in m-cresol. A second terpolymer of carbon monoxide, ethylene and propylene was prepared in the presence of a catalyst formed from palladium acetate, trifluoroacetic acid and 1,3-bis[di(2-methoxyphenyl)phosphino]propane. The second terpolymer had a melting point of 221° C. and a LVN of 1.83 measured at 60° C. in m-cresol.

ILLUSTRATIVE EMBODIMENT II

The first terpolymer of Illustrative Embodiment I was blended with different weight percents of calcium carbonate by use of a twin-screw extruder to produce nibs. The second terpolymer was also extruded to produce nibs for comparison purposes as a control without the addition of calcium carbonate. The nibs were injection molded into test bars of approximately 4.75 in. by 0.5 in. by 0.125 in. dimensions. The test bars were then sliced lengthwise into 3 equal strips and the edges were smoothed off. These strips were tested for flame retardancy.

Standard test method ASTM D2863-77 was used to evaluate the burning behavior of the different blend compositions. This test measures the minimum concentration of oxygen in an oxygen-nitrogen atmosphere that is necessary to initiate and support a flame for 180 seconds on a test strip. The result of the test is expressed as the percentage of oxygen in the oxygen-nitrogen atmosphere and is called the Limiting Oxygen Index (LOI) of the composition.

The LOI values determined for three different blends of the terpolymer of Illustrative Embodiment I and calcium carbonate are given in Table I together with the LOI of the terpolymer without added calcium carbonate used as a control sample. One can see from the LOI values in Table A that a greater percentage of oxygen was required in an oxygen-nitrogen atmosphere to initiate and support a flame on the samples containing calcium carbonate in comparison to the control sample without calcium carbonate. The flame retardancy of the blend compositions is improved for the samples containing calcium carbonate.

TABLE I

| Sample | % Weight Calcium Carbonate | LOI* |
|---|---|---|
| Control | none | 18.5–19 |
| 1 | 5 | 23–23.5 |
| 2 | 10 | 25.5–26 |
| 3 | 25 | 27–27.5 |

*LOI values are expressed as a range obtained for three duplicate test samples.

ILLUSTRATIVE EMBODIMENT III

When a blend of a linear alternating carbon monoxide/ethylene copolymer and magnesium carbonate is produced by a procedure similar to that of Illustrative Embodiment II, it will show good flame retarding properties.

What is claimed is:

1. The flame retardant polymer composition comprising a linear alternating polymer of carbon monoxide and at least one ethylenically unsaturated hydrocarbon and a flame retarding quantity of an alkaline earth metal carbonate.

2. The composition of claim 1 wherein the polymer is a linear alternating polymer of carbon monoxide, ethylene and propylene incorporating from about 2% by weight to about 30% by weight, based on total composition, of an alkaline earth metal carbonate selected from magnesium carbonate and calcium carbonate.

3. The polymer composition comprising a linear alternating polymer of the formula

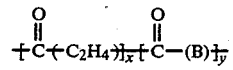

wherein B is the moiety of an ethylenically unsaturated α-olefin of at least 3 carbon atoms polymerized through the ethylenic unsaturation, the ratio of y:x is no more than about 0.5, and a quantity of from about 2% by weight to about 30% by weight based on total composition of calcium carbonate.

4. The composition of claim 3 wherein the α-olefin is propylene and the ratio of y:x is from about 0.01 to about 0.1.

5. The composition of claim 3 wherein y=0.

6. The composition of claim 4 wherein the quantity of calcium carbonate is from about 5% by weight to about 15% by weight, based on total composition.

7. As an article of manufacture, a molded article comprising the composition of claim 1.

* * * * *